United States Patent [19]

Thompson et al.

[11] 4,327,136
[45] Apr. 27, 1982

[54] POLYMERIC MULTI-LAYER SHEET MATERIAL AND TRAY

[75] Inventors: Kenneth P. Thompson, Canton, N.C.; Richard C. Ihde, Strongsville, Ohio

[73] Assignee: Champion International Corporation, Stamford, Conn.

[21] Appl. No.: 181,769

[22] Filed: Aug. 27, 1980

[51] Int. Cl.³ .............................................. B65D 5/00
[52] U.S. Cl. ...................................... 428/35; 206/557; 219/10.55 E; 220/405; 229/2.5 R; 229/3.5 R; 428/71; 428/204; 428/480; 428/319.7
[58] Field of Search ..................... 206/557; 428/67, 68, 428/71, 322, 420, 315, 480, 35, 187, 203, 204; 229/2.5 R, 3.5 R; 219/10.55 E; 220/405

[56] References Cited

U.S. PATENT DOCUMENTS 4,063,641 12/1977 Kuehn et al. ........................ 428/204
4,183,435 1/1980 Thompson et al. ................ 428/322
4,254,173 3/1981 Peer ..................................... 428/204
4,264,657 4/1981 Tolette ................................ 428/204

*Primary Examiner*—James J. Bell
*Attorney, Agent, or Firm*—Evelyn M. Sommer

[57] ABSTRACT

In a multi-layer sheet material from which containers adapted to heat food in microwave ovens may be erected, the sheet material comprising a core layer and a transparent surface layer on each side of the core layer, the improvement comprising an intermediate layer located between the core and at least one of the adjacent surface layers, the intermediate layer being a relatively thin layer of polyethylene terephthalate and a design printed on one side of the intermediate layer whereby the design is visible through the adjacent surface layer and is prevented by the adjacent surface layer from being physically contacted.

10 Claims, 2 Drawing Figures

POLYMERIC MULTI-LAYER SHEET MATERIAL AND TRAY

BACKGROUND OF THE INVENTION

The present invention relates to improved multi-layer sheet materials and more particularly to a polymeric multi-layer material particularly suited for use in making containers for food products to be cooked or reheated in ovens.

All-plastic and plastic-paper laminants for use in making packages or containers are well known. Such laminants are disclosed in U.S. Pat. No. 4,183,435, assigned to the assignee of the present invention. The materials disclosed therein are for the most part intended to be used in making food trays and like containers where the nonporous nature of the material is the critical property. However, as U.S. Pat. No. 4,183,435 points out, a new market or use for such materials is developing. Microwave ovens are becoming more popular with consumers because of the speed at which such ovens can cook or reheat food and because of the lower energy requirements of such ovens relative to conventional ovens. Because microwave ovens cook or reheat food from the inside out, the food containers are not subjected to the same temperatures as they are in conventional ovens. Containers used in microwave ovens are heated only by heat conducted from the food being cooked. Since the temperature demands on the containers are lower, consideration has been given to the use of all-plastic or partially-plastic containers for pre-packed frozen foods in place of the relatively more expensive containers in which frozen food products are now typically packaged.

Thus, U.S. Pat. No. 4,183,435 discloses a novel multi-layer material particularly suitable for containers to be used in microwave ovens. The material includes a core layer of foamed, high density polymeric material and surface layers on both sides of the core layer. The relatively thin surface layers are formed from a polyester material such as polyethylene terephthalate. The core layer provides structural integrity for the material.

While the multi-layer sheet material and tray formed therefrom as disclosed in U.S. Pat. No. 4,183,435 have proven to be entirely satisfactory for the purpose intended, one difficulty has been noted. If any printing is desired on the completed tray, it is usually placed on the back side of the surface layer and when the surface layer is attached to the core layer, the printing is visible through the transparent surface layer. However, when the surface layer is in a roll prior to being applied to the core layer, it has been found that the ink transfers from the back side of the surface layer to the interior side by surface-to-surface contact while in the roll form. When unrolled, the ink that has been transferred to the interior surface of the roll becomes exposed on the outer surface of the outer layer thus coming in direct contact with the food that is placed therein. Since it is exceedingly difficult, if not impossible, to obtain inks which are permitted for direct contact with food, it is difficult to construct such trays with printing thereon that will not come in contact with the food.

SUMMARY OF THE INVENTION

The present invention is an improved multi-layer material particularly suitable for containers to be used in microwave ovens and which may utilize printed designs thereon in such a way as not to come in direct contact with the food therein.

Briefly, the invention comprises a core layer of foamed, high density polymeric material and transparent surface layers on both sides of the core layer which are formed as a relatively thin polyester material and an intermediate layer located between the core and at least one of the adjacent surface layers, said intermediate layer being a relatively thin layer of polyethylene terephthalate which has a design printed on one side thereof whereby the design is visible through the adjacent transparent surface layer but is prevented by said adjacent surface layer from being physically contacted.

DESCRIPTION OF THE DRAWINGS

While the specification concludes with claims particularly pointing out and distinctly claiming that which is regarded as the present invention, further details of the preferred embodiment of the invention may be more readily ascertained from the following detailed description when read in conjunction with the accompanying drawings wherein:

DETAILED DESCRIPTION

Figure 1:
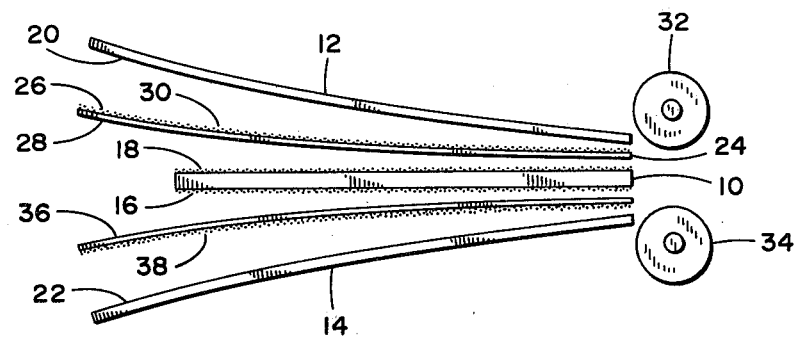
FIG. 1 is a cross-sectional view of a multi-layer composite material incorporating the present invention.

Referring now to the drawings, and in particular to FIG. 1, there is illustrated a cross-sectional view of a multi-layer sheet material in the process of being formed. Such sheet material normally comprises a relatively thick core layer 10 with thinner, co-extensive transparent surface layers 12 and 14. These layers are normally bonded to the core 10 by interposed layers 16 and 18 of suitable adhesive such as EMA, ethylene methylacrylate copolymer. The core layer 10 contemplated by the invention is a foamed, thermo-plastic polymeric material which has a relatively high density in its unfoamed state. A preferred material would be a high density polyethylene or polypropylene with a relatively high softening point. The surface layers are preferably much thinner than the core layer and comprise a thermo-plastic polymeric material such as polyethylene terephthalate, polypropylene, or other suitable polyesters. The surface layers, because of their composition the thickness, are transparent.

Normally, any printing that needs to be done on the multi-layer sheet is located on the under side 20 and 22 of the outer surfaces 12 and 14 respectively. However, when these sheets are formed in a roll prior to being bonded to core layer 10, it has been found that the ink transfers from the back side 20 or 22 of surface layers 12 and 14 to the front side thereof which is the interior side in surface-to-surface contact with the back side 20 or 22 when it is in a roll. Inasmuch as when the tray is formed from the multi-layer material, the outer surfaces are in contact with any food that is placed in the tray, any ink thereon is enabled to come in direct contact with the food.

In order to prevent this problem from occurring, an intermediate layer 24 is located between said core 10 and adjacent surface layer 12. The intermediate layer 24 is a relatively thin, transparent layer of a polyester material such as polyethylene terephthalate. Any printing is then located on either side 26 or side 28 of intermediate layer 24 and any well-known technique used to bond the layers together such as the use of adhesive layers 18 and 30 for example of EMA, ethylene methacrylate copolymer, or the use of heat sealing for bonding purposes such as the use of heated rollers 32 and 34. Thus the printing which is on either surface 26 or 28 of intermediate layer 24 is encapsulated between surface layer 12 and inner core 10. Inasmuch as intermediate layer 24 and adjacent surface layer 12 are transparent, any printing on intermediate layer 24 is visible through surface layer 12. Thus the encapsulation prevents any of the ink forming the printed matter from coming in direct contact with any food on the outside of surface layer 12.

As an alternate embodiment, an additional intermediate layer 36 may be located between the inner core 10 and the other adjacent surface layer 14. Again, as described above with reference to intermediate layer 24, intermediate layer 36 is transparent and may have printing located on either side thereof. An adhesive layer 38 may be utilized in conjunction with adhesive layer 16 on inner core 10 to bond intermediate layer 36 to inner core 10 and surface layer 14. Also, as stated previously, heated rollers 32 and 34 may be utilized to effect the bonding between the various layers instead of utilizing an adhesive.

Thus the novel multi-layer sheet material, formed as illustrated in FIG. 1 in any well-known manner, and when having any printed design formed on either side of either of the intermediate layers 24 and 36, will enable an encapsulation of the printing ink and thus prevent it from directly contacting any food contained in a tray formed from the multi-layer sheet material and yet will allow any visual design or printed matter to be viewed by the user thereof.

Figure 2:
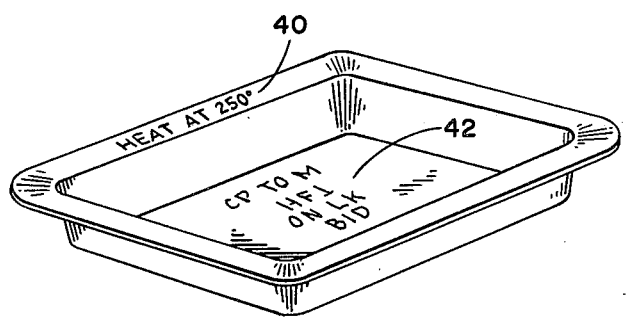
FIG. 2 is a perspective view of a tray made from material formed in accordance with the present invention.

FIG. 2 is a perspective view of a tray made from the material formed in accordance with the present invention and as can be seen therein, printing may occur on any part of the surface thereof such as that shown at 40 and on the bottom of the tray 42. The illustrated tray is, of course, typical of containers which may be made from the materials formed in accordance with the present invention and is intended by way of example and not limitation. Further, other materials may be used to form the novel multi-layer sheet material and tray such as those materials described in U.S. Pat. No. 4,183,435.

While there has been described what is considered to be a preferred embodiment of the invention, variation and modifications therein will occur to those skilled in the art when they become acquainted with the basic concepts of the invention. Therefore, it is intended that the appended claims shall be construed to include not only the preferred embodiment but also such variations and modifications as fall within the spirit and scope of the invention.

What is claimed is:

1. In a multi-layer sheet material from which containers adapted to heat food in microwave ovens may be erected, said sheet material comprising a core layer and separate transparent surface layers on both sides of said core layer, the improvement comprising:
   (a) a single ply intermediate layer located between said core layer and at least one of said adjacent surface layers, said intermediate layer being a relatively thin layer of polyethylene terephthalate, and
   (b) a design printed on each side of said intermediate layer whereby said design is visible through the adjacent surface layer and is prevented by said adjacent surface layer from being physically contacted.

2. The sheet material as in claim 1 further including adhesive layers for bonding said intermediate layer to said core layer and said adjacent surface layer.

3. The sheet material as in claim 1 wherein said material is formed by heat sealing of the intermediate layer to said core layer and said adjacent surface layer.

4. The sheet material as in claim 1 wherein said design is printed on either side of said intermediate layer.

5. The sheet material as in claim 1 wherein an intermediate layer is located between said core and both of said surface layers whereby printing may be visible from either side of said sheet material.

6. A tray suitable for use with food in a microwave oven comprising a bottom wall panel, and a plurality of side wall panels connected to the edges of said bottom wall panel and extending generally upright therefrom, each of said panels being made from a multi-layer sheet material comprising a core layer having both sides covered by a relatively thin, separate, adjacent, transparent surface layer, said improved tray comprising:
   (a) a single ply intermediate layer located between said core layer and at least one of said adjacent surface layers, said intermediate layer being a relatively thin layer of polyethylene terephthalate, and
   (b) a design printed on one side of said intermediate layer whereby said design is visible through said adjacent surface layer and is prevented by said adjacent surface layer from being physically contacted by said food.

7. The tray as in claim 6 further including adhesive layers for bonding said intermediate layer to said core layer and said adjacent surface layer.

8. The tray as in claim 6 wherein said material is formed by heat sealing the intermediate layer to said core layer and said adjacent surface layer.

9. The tray as in claim 6 wherein said design is printed on either side of said intermediate layer.

10. The tray as in claim 6 wherein an intermediate layer is located between said core and both of said surface layers whereby said printing may be visible from either side of said sheet material.

* * * * *